United States Patent [19]

Lupke

[11] Patent Number: 5,002,478

[45] Date of Patent: Mar. 26, 1991

[54] IMPROVEMENTS IN SUCTION APPLYING MOLD BLOCKS IN PIPE FORMING APPARATUS

[76] Inventor: Manfred A. A. Lupke, 10 McLeary Court, Concord, Ontario, Canada, L4K 2Z3

[21] Appl. No.: 405,779

[22] Filed: Sep. 11, 1989

[30] Foreign Application Priority Data

Sep. 16, 1988 [CA] Canada .................................. 577654

[51] Int. Cl.$^5$ .............................................. B29C 53/30
[52] U.S. Cl. ................................ 425/325; 425/326.1; 425/336; 425/396
[58] Field of Search ...................... 425/326.1, 336, 325, 425/396, 371, 504, 519, 532, 72.1, 142, 183, 392, 185; 264/508

[56] References Cited

U.S. PATENT DOCUMENTS

| | | | |
|---|---|---|---|
| 3,981,663 | 9/1976 | Lupke | 425/371 X |
| 4,136,143 | 1/1979 | Lupke et al. | 425/392 X |
| 4,165,214 | 8/1979 | Lupke et al. | 425/532 |
| 4,199,314 | 4/1980 | Lupke et al. | 425/532 |
| 4,218,164 | 8/1980 | Lupke et al. | 425/142 X |
| 4,226,580 | 10/1980 | Lupke et al. | 425/504 |
| 4,319,872 | 3/1982 | Lupke et al. | 425/532 |
| 4,325,685 | 4/1982 | Lupke et al. | 425/183 |
| 4,500,284 | 2/1985 | Lupke | 425/326.1 X |
| 4,504,206 | 3/1985 | Lupke et al. | 425/326.1 |
| 4,510,013 | 4/1985 | Lupke et al. | 425/396 X |
| 4,553,923 | 11/1985 | Lupke | 425/396 X |
| 4,681,526 | 7/1987 | Lupke | 425/532 |
| 4,710,337 | 12/1987 | Nordstrom | 425/396 X |
| 4,770,618 | 9/1988 | Lupke | 425/72.1 |
| 4,900,503 | 2/1990 | Hegler et al. | 425/396 X |

Primary Examiner—Richard L. Chiesa

[57] ABSTRACT

The invention concerns apparatus for making corrugated tubing. Mold blocks for formation of a travelling mold tunnel are provided with suction to the mold face by means of communication between suction passages in the mold block and a suction chamber. Each mold block has a channel which slidingly engages a track of the suction chamber to receive suction as the mold blocks travel over the track. Tongue and groove connectors are provided between the channel of each block and the track of the suction chamber and communication surfaces of the tongue and groove connectors to provide suction from the suction chamber to the mold face.

4 Claims, 3 Drawing Sheets

IMPROVEMENTS IN SUCTION APPLYING MOLD BLOCKS IN PIPE FORMING APPARATUS

BACKGROUND OF THE INVENTION

1. Field of the Invention

This invention relates to the apparatus for making corrugated or ribbed thermoplastic tubing of helical or annular form, the apparatus being of the type in which tubing of the thermoplastic material is continuously extruded into a tubular mold tunnel.

2. Background of the Invention

The tubular mold tunnel is defined by cooperatively interengaged mold blocks of a pair of mold assemblies, the mold blocks of each mold assembly being driven along a forward run in which the blocks define the modular block tunnel, and back along a return run. The mold blocks have molding surfaces comprising troughs for molding ribs of the tubing, and crests for molding grooves of the tubing. Such an apparatus is disclosed for example U.S. Pat. No. 4,319,872 issued on Mar. 16, 1982 to Gerd P. H. Lupke and Manfred A. A. Lupke.

With such known apparatus, it is desirable to apply vacuum between the mold blocks to encourage proper location of thermoplastic material against the mold face.

Each mold block may be a two part assembly of a carrier block which extends transversely between endless conveyor chains and a mold which is interchangeable on the carrier block for molding different sizes and configurations of tube.

When suction is to be applied to the mold face it may be drawn from stationary suction chambers above the mold block assemblies in the upper run and/or below the mold block assemblies in the lower run.

The carrier blocks carried by the endless conveyor chains may approach the suction chamber at the beginning of the mold tunnel. They are usually slidably engaged on the vacuum tunnel while forming part of the mold tunnel and receive suction from the suction chamber for transmission to the mold face. The carrier blocks may disengage from the suction chamber at any suitable point. For example the suction chamber may be elongate to run contiguously with the mold tunnel and the carrier blocks may disengage at the end of the suction chamber for their return run to reform the mold tunnel. Such mold blocks for applying suction are for example described in U.S. Pat. No. 4,319,872. However each mold block disclosed in that patent comprise a single block rather than the assembled mold and carrier block. Moreover, the suction chambers are arranged on the sides of the molds rather than along a bottom surface of the mold tunnel. Due to the fact that the carrier blocks must, as they are carried on the endless conveyor chains, readily engage the suction chamber smoothly and without interruptions, the tolerances between carrier block channels at suction chamber tracks have been quite large. Moreover, for greater smoothness and easy engagement the mating channels and track have tended to have rounded edges. While these precautions have normally led to smooth operation of the conveyor, sealing of the vacuum connection between the carrier block and the suction chamber has presented problems.

SUMMARY OF THE INVENTION

It has now been discovered that it may be possible to improve the seal between the vacuum tunnel and the carrier blocks.

Thus according to the invention is provided an apparatus for producing corrugated or ribbed thermoplastic tubing, the apparatus comprising a pair of complementary mold assemblies each comprising mold blocks driven in synchronism to form a mold tunnel of cooperating pairs of mold blocks along a forward run, and extrusion means disposed at the entrance to the mold tunnel for extruding a tube of thermoplastic materials into the tunnel, each mold block having a surface containing a mold face and being formed with interior passages communicating the mold face with first ports in a channel in a surface of the mold block opposed to that containing the mold face with suction from a stationary suction chamber through first ports in a channel of each mold block and second ports in a cooperating track of the stationary suction chamber.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENT

Figure 1:
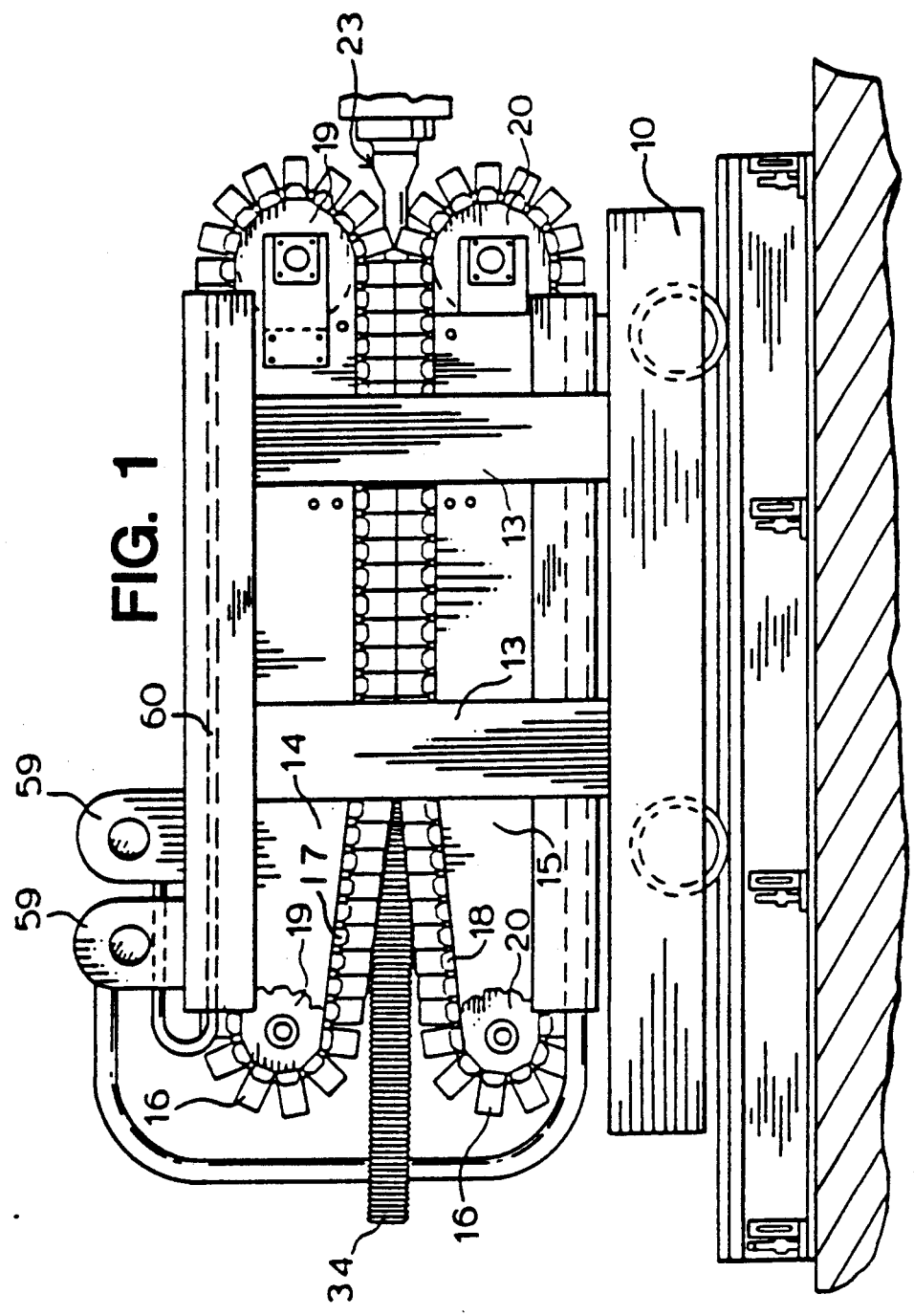
FIG. 1 is a somewhat simplified side elevation of one embodiment of a pipe-forming apparatus in accordance with the invention.

Referring to the drawings and more particularly to FIG. 1 thereof, the apparatus comprises a carriage 10 supporting a pair of complementary upper and lower mold assemblies 14 and 15 respectively. Each mold assembly 14 and 15 comprises an endless chain of articulately interconnected mold blocks 16. The mold assembly 14 further comprises a pair of transversely spaced endless conveyor chains, with each mold block 16 of the assembly 14 extending transversely between opposed links of these chains by means of pins 47 on the mold block 16 (see FIG. 2). The mold assembly 15 likewise further comprises a pair of endless conveyor chains (only one of which is shown in the drawings and is denoted by the reference number 18), with each mold block 16 of the assembly 15 extending transversely between opposed links of this pair of chains including the chain 18. The chains are entrained around drive sprockets 19 and 20, with drive means (not shown) being connected to at least one of the sprockets 19 and at least one of the sprockets 20 for operatively driving the mold blocks 16 of each assembly 14 and 15 in synchronism along a forward run and back along a return run, the mold blocks 16 of the assemblies 14 and 15 cooperating in pairs along the forward run to define an axially extending tubular mold tunnel.

By means of the carriage 10 the mold assemblies 14 and 15 may be operatively positioned to locate an extrusion head 23 being operatively coupled to the nozzle of an extrusion machine, which may be of conventional form. If required, the mold assemblies 14 and 15 can be moved away from the extrusion head 23 by movement of the carriage 10 in order to provide access to the extrusion head 23.

As shown in FIG. 1, each mold assembly 14, 15 may further comprise an air distributing duct 60 extending along the return run of the mold blocks 16 of the respective mold assembly 14 and 15 and positioned to distribute cooling air to the exposed interior surfaces of the mold blocks 16 as they travel along the return run. The distributing ducts 60 are each connected to a respective blower 59 by which the cooling air is supplied to them. Each mold assembly 14, 15 may further comprise a heat sink provided by a tank through which cooling water may be circulated. The mold assembly housings may be cooled in this manner during a molding operation; however in order to avoid wastage of material at the commencement of a molding operation, the water in the housings may be preheated to the required temperature.

Figure 2:
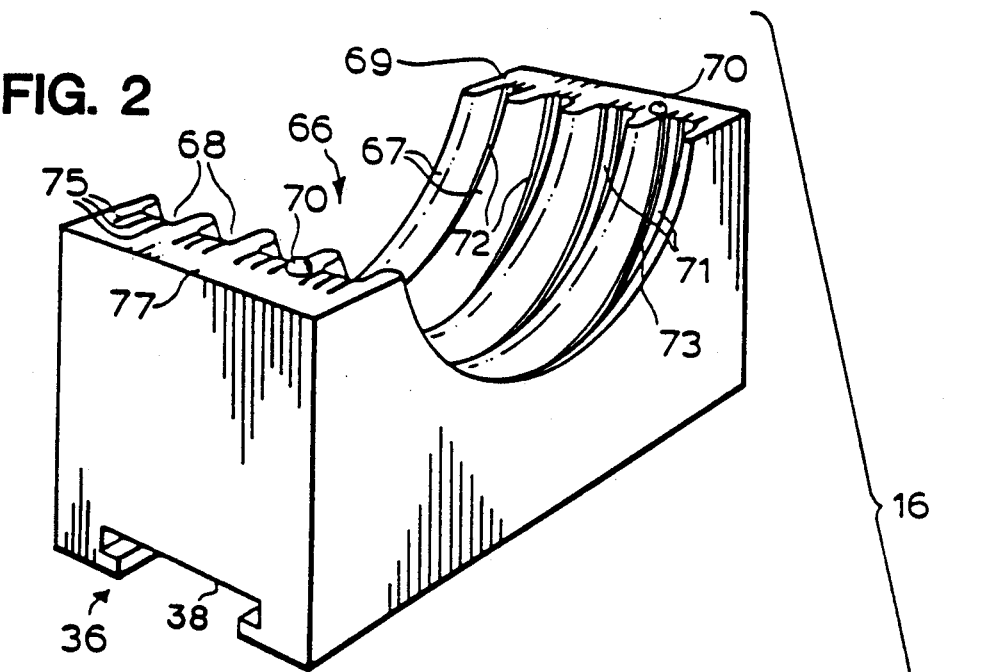
FIG. 2 is an exploded view of a mold block embodying the invention and comprising an assembly of a mold and a carrier block.
Figure 2:
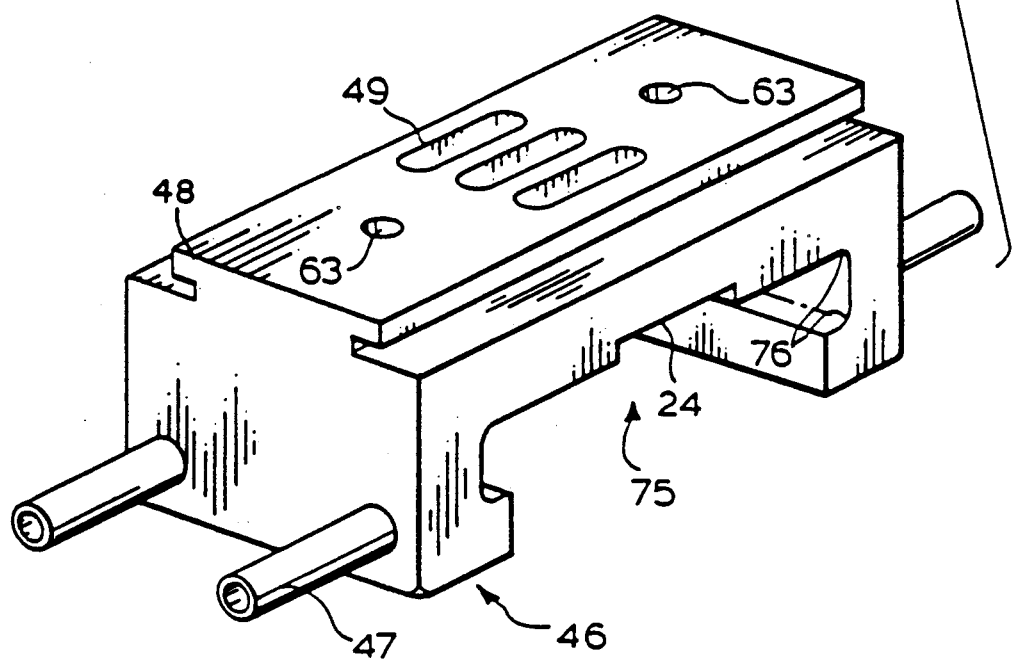

Referring now to FIGS. 2, it will be noted that each mold block 16 comprises a mold 36 of generally rectangular shape and a carrier block 46. The mold 36 has a pair of end faces, side and bottom faces, and a top face which is provided with a hemi-cylindrical recess 66 contoured to provide a corrugated mold wall defined by alternating crests 67 and troughs 68. As shown in FIG. 2, the top face 69 of the mold 36 is provided with a pair of locating pins 70 one of which is disposed on each side of the hemi-cylindrical recess 66, these pins 70 being adapted to register with correspondingly shaped sockets in the complementary top face 69 of a cooperating mold 36 of the other mold assembly 14 or 15.

When the mold block 16 comprises an assembly of a mold 36 and a carrier block 46, molding of different shapes and sizes of tube is possible by interchanging molds 36 on the carrier block 46. Thus molds 36 may be of varying sizes and shapes or may define annular corrugations or helical corrugations. The molds 36 may be used for ribbed or corrugated tubing.

Conveniently each mold 36 is connected to its carrier block 46 by a channel 38 in the base of mold 36 which may be slidingly engaged on a slide 48 of complementary shape or carrier block 46. Each channel 38 and corresponding slide 48 are provided transverse to the direction of movement of the mold assemblies 14, 15 so that there is less tendency for molds 36 to slip on the carrier blocks in the direction of movement. Additionally to mitigate any unwanted slipping of molds 36 in use, each mold 36 is provided with spring loaded locating balls 62 releasably engagable in sockets 63 of the respective carrier block 46.

During the molding of the thermoplastic tubing 34 there is a tendency for atmospheric air to be trapped by the tubing 34 in the troughs 68, this entrapped air preventing proper molding of the tubing 34 in the troughs 68, and particularly in the corners at the bases 71 of the troughs 68. As is shown in FIG. 2, a continuous groove 72 is provided in each corner of the base 71 of each trough 68. An additional groove 73 may also be provided in the base 71 of each trough 68 between the corner grooves 72. These grooves 72 and 73 communicate with recess 75 in the base of the cooperatively interengaging mold blocks 16 through manifold passages 76.

A stationary elongate suction chamber 80 may be located above the upper forward run of mold assembly 14 and below the lower forward run of mold assembly 15. A pipe 87 communicates the interior of suction chamber 80 with a source of suction. Each track 81 of the suction chambers 80 may be located such that each recess 75 of each mold block 16 mates with it automatically as the mold block 16 starts its forward run. For optimum ease of mating the corners 76 of recess 75 and corners 86 of track 81 may be somewhat rounded and the fit between the track 81 and recess 76 may be loose. The suction chamber 80 communicates with grooves 72, 73 through manifold passages 76 extending in mold blocks 16 and opening at ports within recess 75 to communicate with ports 78 in the track of the suction chamber. When mold blocks 16 each comprise a mold 36 and a carrier block 46 the passages 76 extend in both the mold 36 and carrier block 46 through ports 37 of the mold 36 and ports 49 of carrier block 46.

Thus, the grooves 73 and 73, the manifold passages including ports 37 and 49, and the ports 78 constitute passages which extend between the bases 71 of the troughs 68 of the corrugations, and particularly the corners thereof, and the exterior of the associated mold block 16. These passages communicate with the base 71 of each trough 68 throughout its length. The grooves 72, 73 are generally rectangular and sufficiently narrow in width to prevent any of the thermoplastic material of the tubing 34 from being forced into these grooves 72, 73 or slits 84. The grooves 72, 73 may each have a width of approximately 0.02 inches.

Figure 3:
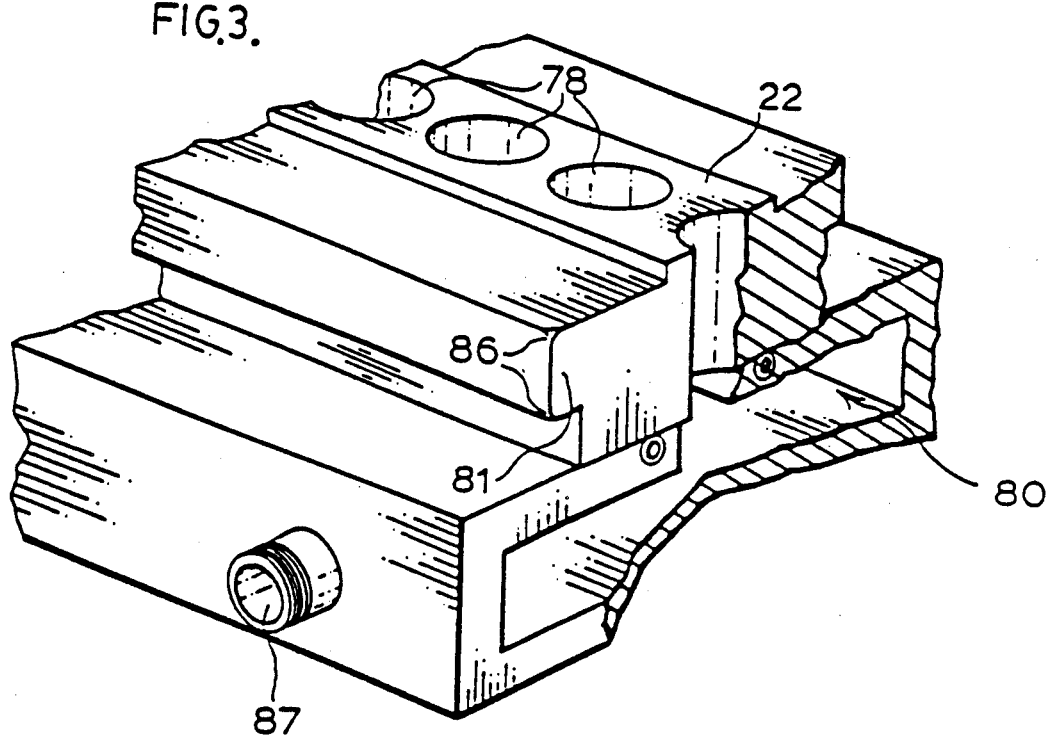
FIG. 3 is a perspective fragmentary view of a suction chamber partially broken away to show the interior chamber.
Figure 4:
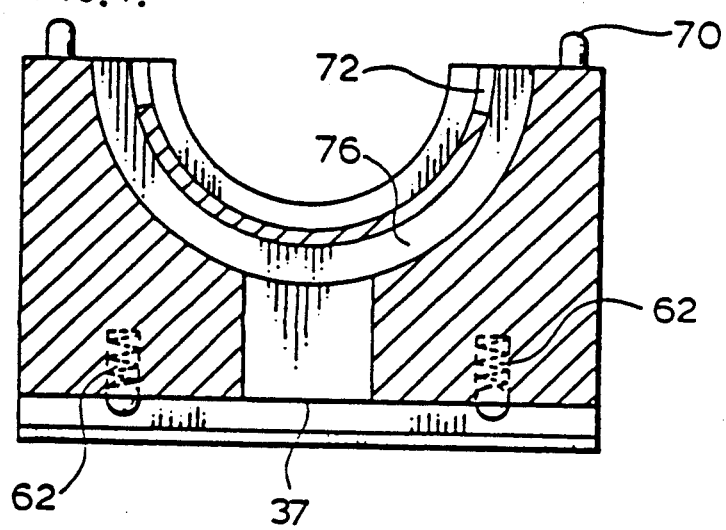
FIG. 4 is a section of the mold on the line V—V of FIG. 2.

FIGS. 2 and 3 show the tongue connector 22 located on the upper surface of track 81 to mate with groove connector 24 on the lower complementary surface of recess 75. These tongue and groove connectors may be made with sharp corners and may be of a tighter fit than that of recess 75 with track 80.

Thus, in operation, when carrier block 46 engages suction chamber 80 by engagement of recess 75 onto track 81, the carrier block may then settle to locate tongue 22 firmly in groove 24. This sharper, firmer connection than is conveniently achievable directly through recess 75 and track 81, may provide a good seal for suction between carrier block 46 and suction chamber 80.

Other embodiments are possible within the scope of the appended claims.

I claim:

1. A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:

the mold block assemblies formed in the direction transverse to the formed mold tunnel, said mold block assemblies including at least one molding member and a corresponding carrier block, said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly, said carrier block incorporating a first member of a cooperating tongue and groove connector, said tongue and groove connector containing a suction channel and at least one suction port in suction communication with said suction recesses, a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track elements guide said mold block assembly relative to said stationary suction chamber.

2. A device according to claim 1 where said first member of said cooperating tongue and groove connector means is a groove.

3. A device according to claim 1 where said second track element is a channel.

4. A device according to claim 1 where said tongue and groove connector means also is the track.

* * * * *

REEXAMINATION CERTIFICATE (3887th)

United States Patent [19]
Lupke

[11] B1 5,002,478
[45] Certificate Issued Oct. 5, 1999

[54] SUCTION APPLYING MOLD BLOCKS IN PIPE FORMING APPARATUS

[75] Inventor: Manfred A. A. Lupke, Concord, Canada

[73] Assignee: Corma Inc., Concord, Canada

Reexamination Request:
No. 90/005,078, Aug. 20, 1998

Reexamination Certificate for:
Patent No.: 5,002,478
Issued: Mar. 26, 1991
Appl. No.: 07/405,779
Filed: Sep. 11, 1989

[30] Foreign Application Priority Data

Sep. 16, 1988 [CA] Canada ................................... 577654

[51] Int. Cl.$^6$ ............................................. B29C 53/30
[52] U.S. Cl. ..................... 425/325; 425/326.1; 425/336; 425/396
[58] Field of Search ...................... 425/336, 396, 425/326.1, 325, 371, 504, 519, 532, 72.1, 142, 183, 185, 392; 264/508

[56] References Cited

U.S. PATENT DOCUMENTS

| | | | |
|---|---|---|---|
| 4,199,314 | 4/1980 | Lupke et al. | 425/396 X |
| 4,319,872 | 3/1982 | Lupke et al. | 425/326.1 X |
| 4,439,130 | 3/1984 | Dickhut et al. | 425/396 X |

FOREIGN PATENT DOCUMENTS 902314   6/1972   Canada .

*Primary Examiner*—Richard Chiesa

[57] ABSTRACT

The invention concerns apparatus for making corrugated tubing. Mold blocks for formation of a travelling mold tunnel are provided with suction to the mold face by means of communication between suction passages in the mold block and a suction chamber. Each mold block has a channel which slidingly engages a track of the suction chamber to receive suction as the mold blocks travel over the track. Tongue and groove connectors are provided between the channel of each block and the track of the suction chamber and communication surfaces of the tongue and groove connectors to provide suction from the suction chamber to the mold face.

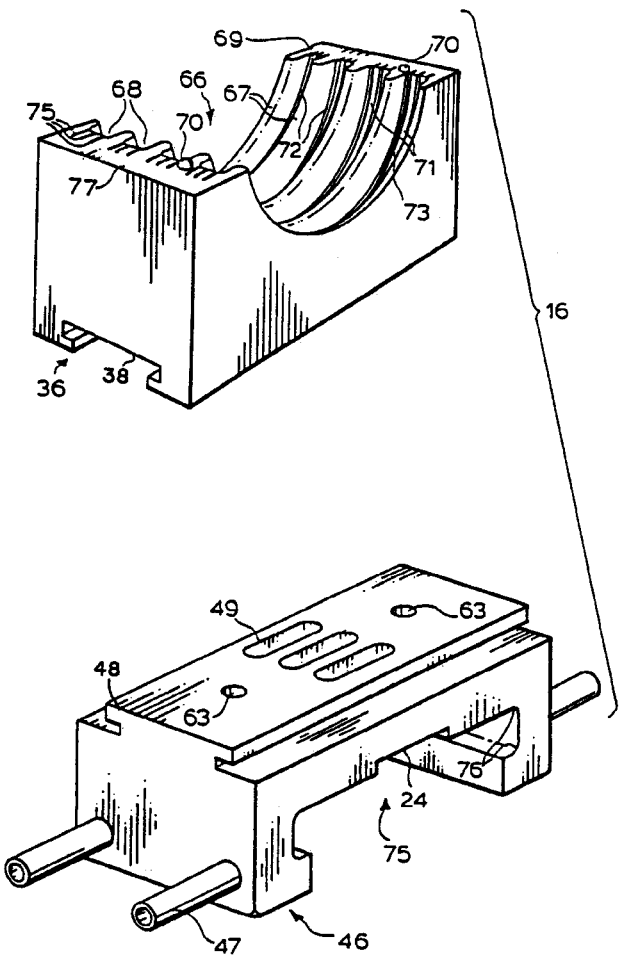

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5–11 are added and determined to be patentable.

5. *A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to a form a cylindrical mold tunnel along a forward run, comprising:*

*the mold block assemblies formed in the direction transverse to the formed mold tunnel, said mold block assemblies including at least one molding member and a corresponding carrier block,*

*said molding member having a substantially hemi-cylindrical inner surface including profiled molding face defining alternating crests and troughs, a plurality of continuous suction recessed disposed within the troughs between the crests, said carrier block being interengagable with said molding member to form said mold block assembly,*

*said carrier block incorporating a first member of a cooperating tongue and groove connector, said tongue and groove connector containing a suction channel and at least one suction port in suction communication with said suction recesses,*

*a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member,*

*where said tongue and groove connector, stationary suction chamber and molding member are vertically aligned; and*

*a track defined by a first cooperating track element on said carrier block and a second cooperating track element on said stationary suction chamber, where said first and second cooperating track elements guide said mold block assembly relative to said stationary suction chamber.*

6. *A device for producing profile thermoplastic tubing extruded from a parison of thermoplastic material from an extrusion element, the device including a pair of opposed complementary mold block assemblies composed of elongated and substantially hemi-cylindrical individual mold block assemblies where the mold block assemblies are separately driven in synchronism to form a cylindrical mold tunnel along a forward run, comprising:*

*the mold block assemblies formed in the direction transverse to the formed mold tunnel, said mold block assemblies including at least one molding member and a corresponding carrier block,*

*said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly,*

*said carrier block incorporating a first member of a cooperating tongue and groove connector, said tongue and groove connector containing a suction channel and at least one suction port in suction communication with said suction recesses,*

*a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and*

*a track defined by a first cooperating track element on said carrier block and a second cooperating track element on said stationary suction chamber, where said first and second cooperating track elements guide said mold block assembly relative to said stationary suction chamber.*

7. *A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:*

*the mold block assemblies formed in the direction transverse to the formed mold tunnel, said mold block assemblies including at least one molding member and a corresponding carrier block,*

*said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly,*

*said carrier block incorporating a first member of a cooperating tongue and groove connector, said tongue and groove connector containing a suction channel and at least one suction port in suction communication with said suction recesses,*

*a stationary suction chamber means for communicating suction to said mold block assembly, said stationary suction means including a second member of said cooperating tongue and groove connector means* complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track elements guide said mold block assembly relative to said stationary suction chamber where said tongue and groove connector, stationary suction chamber and molding member are vertically aligned.

8. A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:

the mold block assemblies formed in the direction transverse to the formed mold tunnel, said mold block assemblies including at least one molding member and a corresponding carrier block, and where the mold block assemblies are opposed and separately driven, said molding member having a substantially hemi-cylindrical inner surface including profiled molding face defining alternating crests and troughs, a plurality of continuous suction recessed disposed within the troughs between the crests, said carrier block being interengagable with said molding member to form said mold block assembly, said carrier block incorporating a first member of a cooperating tongue and groove connector, said tongue and groove connector containing a suction channel and at least one suction port in suction communication with said suction recesses, a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track element guide said mold block assembly relative to said stationary suction chamber.

9. A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:

the mold block assemblies formed in the direction transverse to the formed mold tunnel, said mold block assemblies including at least one molding member and a corresponding carrier block, said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly, said molding member including a channel and said carrier block including a slide, said carrier block being interengagable with said molding member to form said mold block assembly when said slide is engaged with said channel, said carrier block incorporating a first member of a cooperating tongue and groove connector, said tongue and groove connector containing a suction channel and at least one suction port in suction communication with said suction recesses, a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track elements guide said mold block assembly relative to said stationary suction chamber and where said tongue and groove connector, stationary suction chamber and molding member are vertically aligned.

10. A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:

the mold block assemblies formed in the direction transverse to the formed mold tunnel, said mold block assemblies including at least one molding member and a corresponding carrier block, said molding member including a channel and said carrier block including a slide, said carrier block being interengagable with said molding member to form said mold block assembly when said slide is engaged with said channel, said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly, said carrier block incorporating a first member of a cooperating tongue and groove connector, said tongue and groove connector containing a suction channel and at least one suction port in suction communication with said suction recesses.

a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track elements guide said mold block assembly relative to said stationary suction chamber, and where the mold block assemblies are opposed and separately driven.

11. A device for producing profile thermoplastic tubing extruded from a parison of thermoplastic material from an extrusion element, the device including a pair of complementary mold block assemblies composed of elongated and substantially hemi-cylindrical individual mold block assemblies where the mold block assemblies are driven in synchronism to form a cylindrical mold tunnel along a forward run, comprising:

the mold block assemblies formed in the direction transverse to the formed mold tunnel, said mold block assemblies including at least one molding member and a corresponding carrier block, said molding member having a substantially hemi-cylindrical inner surface including profiled molding face defining alternating crests and troughs, a plurality of continuous suction recesses disposed within the troughs between the crests, said carrier block being interengagable with said molding member to form said mold block assembly, said carrier block incorporating a first member of a cooperating tongue and groove connector, said tongue and groove connector containing a suction channel and at least one suction port in suction communication with said suction recesses, a stationary suction chamber means for communicating suction to said mold block assembly, said stationary suction means including a second member of said cooperating tongue and groove connector means complementarily dimensioned to mate with said first member and at least one vacuum communication port extending through said second member, whereupon engagement of said first and second cooperating members establish suction communication between said stationary suction chamber and said recesses of the molding member, and a track defined by a first cooperating track element on said carrier block and a second cooperating track element on said stationary suction chamber, where said first and second cooperating track elements guide said mold block assembly relative to said stationary suction chamber, where said tongue and groove connector, stationary suction chamber and molding member are vertically aligned, and where the mold block assemblies are opposed and separately driven.

* * * * *